US012679142B2

(12) United States Patent
Rimai

(10) Patent No.: US 12,679,142 B2
(45) Date of Patent: Jul. 14, 2026

(54) NON-PNEUMATIC TIRE WITH WEB STRUCTURE

(71) Applicant: Bridgestone Americas Tire Operations, LLC, Nashville, TN (US)

(72) Inventor: Benjamin E. Rimai, Copley, OH (US)

(73) Assignee: Bridgestone Americas Tire Operations, LI.C, Nashville, TN (US)

( * ) Notice: Subject to any disclaimer, the term of this patent is extended or adjusted under 35 U.S.C. 154(b) by 432 days.

(21) Appl. No.: 18/038,330

(22) PCT Filed: Dec. 2, 2021

(86) PCT No.: PCT/US2021/072694
§ 371 (c)(1),
(2) Date: May 23, 2023

(87) PCT Pub. No.: WO2022/140726
PCT Pub. Date: Jun. 30, 2022

(65) Prior Publication Data
US 2023/0415517 A1     Dec. 28, 2023

Related U.S. Application Data

(60) Provisional application No. 63/130,451, filed on Dec. 24, 2020.

(51) Int. Cl.
*B60C 7/14*          (2006.01)
*B60C 7/10*          (2006.01)
(52) U.S. Cl.
CPC .............. *B60C 7/146* (2021.08); *B60C 7/107* (2021.08)
(58) Field of Classification Search
CPC ......... B60C 7/102; B60C 7/107; B60C 7/143; B60C 7/146

(Continued)

(56) References Cited

U.S. PATENT DOCUMENTS 6,615,885 B1 *   9/2003   Ohm ......................... B60B 9/26
                                                                    152/17
9,290,045 B2     3/2016   Cron et al.
(Continued)

FOREIGN PATENT DOCUMENTS

CN        104302488 A      1/2015
CN        113260521 A  *   8/2021   ............... B60C 7/24
(Continued)

OTHER PUBLICATIONS

Supplementary European Search Report; Corresponding EP Application Serial No. 21912260; dated Oct. 8, 2024.
(Continued)

*Primary Examiner* — S. Joseph Morano
*Assistant Examiner* — Eva L Comino
(74) *Attorney, Agent, or Firm* — Shaun J. Fox; Bryan J. Jaketic

(57)          ABSTRACT

A non-pneumatic tire includes a lower ring having a first diameter, an upper ring having a second diameter greater than the first diameter, and a plurality of closed geometric shapes connected to the lower ring. The non-pneumatic tire further includes a plurality of spokes extending from each closed geometric shape to the upper ring. Each of the plurality of spokes includes a first linear segment connected to one of the plurality of closed geometric shapes and extending in a first direction, and a second linear segment connected to the upper ring and extending in a second direction different from the first direction.

19 Claims, 6 Drawing Sheets

(58) Field of Classification Search
USPC .......................................................... 152/12
See application file for complete search history.

(56) References Cited

U.S. PATENT DOCUMENTS

| | | | |
|---|---|---|---|
| 2008/0053586 A1 | 3/2008 | Hanada et al. | |
| 2009/0211674 A1* | 8/2009 | Hanada | B60C 7/12 |
| | | | 152/53 |
| 2009/0211678 A1 | 8/2009 | Palinkas et al. | |
| 2011/0079335 A1* | 4/2011 | Manesh | B60C 7/107 |
| | | | 152/310 |
| 2011/0290394 A1* | 12/2011 | Luchini | B60C 7/107 |
| | | | 152/209.1 |
| 2018/0037054 A1* | 2/2018 | Cron | B60B 9/04 |
| 2018/0361794 A1* | 12/2018 | Manesh | B60C 7/18 |
| 2020/0215855 A1* | 7/2020 | Knospe | B60C 7/146 |
| 2020/0324571 A1* | 10/2020 | Tardiff | B60C 7/146 |
| 2020/0324575 A1 | 10/2020 | Christenbury | |
| 2021/0129587 A1* | 5/2021 | Yang | B60C 7/146 |

FOREIGN PATENT DOCUMENTS

| | | | | | |
|---|---|---|---|---|---|
| CN | 117799363 A | * | 4/2024 | .............. | B60C 7/10 |
| EP | 2177375 A1 | * | 4/2010 | .............. | B60C 7/101 |
| EP | 2679406 A1 | * | 1/2014 | .............. | B60C 7/107 |
| JP | 3923073 B1 | * | 5/2007 | .............. | B60C 7/18 |
| JP | 2011025759 A | | 2/2011 | | |
| JP | 2013079037 A | * | 5/2013 | | |
| KR | 20250080292 A | * | 6/2025 | .............. | B60C 7/146 |
| TW | 202118653 A | * | 5/2021 | .............. | B60C 7/146 |
| WO | WO-2011025491 A1 | * | 3/2011 | .............. | B60B 21/06 |
| WO | WO-2013152067 A1 | * | 10/2013 | .............. | B60C 7/18 |
| WO | WO-2016126983 A1 | * | 8/2016 | .............. | B60C 9/1807 |
| WO | WO-2017116565 A1 | * | 7/2017 | .......... | B29C 66/843 |
| WO | 2017205995 A1 | | 12/2017 | | |
| WO | 2019118225 | | 6/2019 | | |

OTHER PUBLICATIONS

International Search Report and Written Opinion; Corresponding PCT Application Serial No. PCT/2021072694 filed Dec. 2, 2021; Authorized Officer Chan Yoon Hwang; Apr. 4, 2022.

* cited by examiner

100

110

120

115 105

400

405    415

410    420

400

405    415

410    420

NON-PNEUMATIC TIRE WITH WEB STRUCTURE

FIELD OF INVENTION

The present disclosure relates to a non-pneumatic tire having a web structure and a method of making the same. More particularly, the present disclosure relates to a non-pneumatic tire having web formed of a plurality of closed geometric shapes and a plurality of spokes, and a method of making the same.

BACKGROUND

Various tire constructions have been developed which enable a tire to run in an uninflated or underinflated condition. Non-pneumatic tires do not require inflation, while "run flat tires" may continue to operate after receiving a puncture and a complete or partial loss of pressurized air, for extended periods of time and at relatively high speeds. Non-pneumatic tires may include a plurality of spokes, a webbing, or other support structure that connects an inner ring to an outer ring.

SUMMARY OF THE INVENTION

In one embodiment, a non-pneumatic tire has a plurality of hoops including at least a first hoop and a second hoop. Each of the plurality of hoops has opposing faces lying in opposing planes substantially perpendicular to a rotational axis of the non-pneumatic tire. Each of the plurality of hoops includes a lower ring having a first diameter and an upper ring having a second diameter greater than the first diameter. The upper ring is substantially coaxial with the lower ring. Each of the plurality of hoops also has support structure extending between the lower ring and the upper ring. The support structure includes a plurality of closed geometric shapes connected to the lower ring, and a plurality of spokes extending from each closed geometric shape to the upper ring. Each of the plurality of spokes includes a first linear segment connected to one of the plurality of closed geometric shapes and extending in a first direction and a second linear segment connected to the upper ring and extending in a second direction different from the first direction.

In another embodiment, a method of making a non-pneumatic tire includes providing a first hoop having a first face and a second face. The first hoop includes a first lower ring extending laterally from the first face to the second face and a first upper ring extending laterally from the first face to the second face. The first upper ring is substantially coaxial with the first lower ring. The first hoop further includes a first plurality of closed geometric shapes connected to the first lower ring and extending laterally from the first face to the second face, and a first plurality of spokes extending from the first plurality of closed geometric shapes to the first upper ring. Each of the first plurality of spokes includes a first linear segment connected to one of the first plurality of closed geometric shapes and extending in a first direction and a second linear segment connected to the upper ring and extending in a second direction different from the first direction. The method also includes providing a second hoop having a first face and a second face. The second hoop includes a second lower ring extending laterally from the first face to the second face and a second upper ring extending laterally from the first face to the second face. The second upper ring is substantially coaxial with the second lower ring. The second hoop further includes a second plurality of closed geometric shapes connected to the second lower ring and extending laterally from the first face to the second face, and a second plurality of spokes extending from the second plurality of closed geometric shapes to the second upper ring. The second plurality of spokes have substantially the same geometry as the first plurality of spokes. The method also includes aligning the first face of the first hoop with the first face of the second hoop such that the first plurality of spokes extend in a direction opposite to the second plurality of spokes.

In yet another embodiment, a non-pneumatic tire includes a lower ring having a first diameter, an upper ring having a second diameter greater than the first diameter, and a plurality of closed geometric shapes connected to the lower ring. The non-pneumatic tire further includes a plurality of spokes extending from each closed geometric shape to the upper ring. Each of the plurality of spokes includes a first linear segment connected to one of the plurality of closed geometric shapes and extending in a first direction, and a second linear segment connected to the upper ring and extending in a second direction different from the first direction.

BRIEF DESCRIPTION OF DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

DETAILED DESCRIPTION

The following includes definitions of selected terms employed herein. The definitions include various examples or forms of components that fall within the scope of a term and that may be used for implementation. The examples are not intended to be limiting. Both singular and plural forms of terms may be within the definitions.

"Axial" and "axially" refer to a direction that is parallel to the axis of rotation of a tire.

"Circumferential" and "circumferentially" refer to a direction extending along the perimeter of the surface of the tread perpendicular to the axial direction.

"Radial" and "radially" refer to a direction perpendicular to the axis of rotation of a tire.

"Tread" as used herein, refers to that portion of the tire that comes into contact with the road or ground under normal inflation and normal load.

While similar terms used in the following descriptions describe common tire components, it should be understood that because the terms carry slightly different connotations, one of ordinary skill in the art would not consider any one of the following terms to be purely interchangeable with another term used to describe a common tire component.

Directions are stated herein with reference to the axis of rotation of the tire. The terms "upward" and "upwardly" refer to a general direction towards the tread of the tire, whereas "downward" and "downwardly" refer to the general direction towards the axis of rotation of the tire. Thus, when relative directional terms such as "upper" and "lower" or "top" and "bottom" are used in connection with an element, the "upper" or "top" element is spaced closer to the tread than the "lower" or "bottom" element. Additionally, when relative directional terms such as "above" or "below" are used in connection with an element, an element that is "above" another element is closer to the tread than the other element.

The terms "inward" and "inwardly" refer to a general direction towards the equatorial plane of the tire, whereas "outward" and "outwardly" refer to a general direction away from the equatorial plane of the tire and towards the side of the tire. Thus, when relative directional terms such as "inner" and "outer" are used in connection with an element, the "inner" element is spaced closer to the equatorial plane of the tire than the "outer" element.

Figure 1:
FIG. 1 is a front view of one embodiment of a hoop 100 for a non-pneumatic tire.

FIG. 1 illustrates a front view of one embodiment of a hoop 100 for a non-pneumatic tire. The hoop 100 includes a lower ring 105 having a first diameter and an upper ring 110 having a second diameter greater than the first diameter. The lower ring 105 is coaxial with the upper ring 110. The hoop 100 also includes a webbing or web structure that is formed by a plurality of closed geometric shapes 115 connected to the lower ring 105, and a plurality of spokes 120 extending from each closed geometric shape 115 to the upper ring 110.

Each of the plurality of closed geometric shapes 115 defines an opening that extends from a first side of the hoop 100 to a second side of a hoop 100. Thus, the opening is visible from both the first and second sides of the hoop 100. In the illustrated embodiment, each of the closed geometric shapes 115 has a hexagonal shape with substantially the same dimensions. In an alternative embodiment, one or more of the closed geometric shapes may have different dimensions. It should also be understood that the closed geometric shape is not limited to a hexagonal shape. In other alternative embodiments, the closed geometric shapes may be triangular, square, rectangular, pentagonal, heptagonal, octagonal, circular, ovular, elliptical, or any other geometric shape. The closed geometric shape may have straight sides, curved sides, or both straight and curved sides.

In the illustrated embodiment, a pair of spokes 120a,b extends from each closed geometric shape 115. In an alternative embodiment, a single spoke extends from each closed geometric shape. In another alternative embodiment, three or more spokes extends from each close geometric shape. In yet another alternative embodiment, the number of spokes extending from each closed geometric shape may vary.

Figure 2:
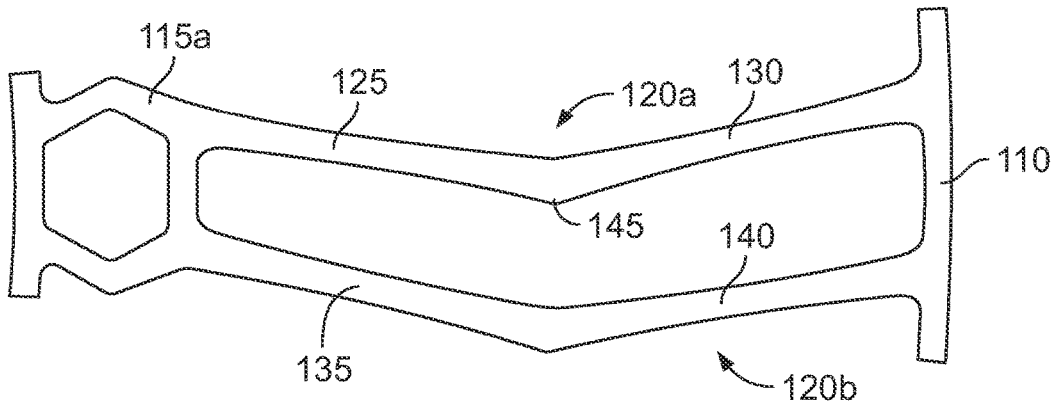
FIG. 2 is a partial front view of an enlarged portion of the hoop 100.

FIG. 2 illustrates a partial front view of an enlarged portion of the hoop 100, and shows a single geometric shape 115a and its associated pair of spokes, including a first spoke 120a and a second spoke 120b. As can be seen in this view, the first spoke 120a includes a first linear segment 125 connected to the closed geometric shape 115a and extending in a first direction. The first spoke 120a further includes a second linear segment 130 connected to the first linear segment 125 and extending to the upper ring 110 in a second direction different from the first direction, and forming an acute angle with the upper ring 110.

Likewise, the second spoke 120b also includes a first linear segment 135 connected to the closed geometric shape 115a and extending in the first direction. The second spoke 120b further includes a second linear segment 140 connected to the first linear segment 135 and extending to the upper ring 110 in the second direction, thus also forming an acute angle with the upper ring 110.

The spokes 120 feature a directional geometry so that they are predisposed to buckle in a specific direction when the spokes 120 deflect to avoid colliding with neighboring spokes. In the illustrated embodiment, the first linear segment 125 of the first spoke 120a is substantially parallel to the first linear segment 135 of the second spoke 120b. In an alternative direction, the first linear segment of the first spoke may extend from the closed geometric shape at an angle different from that of the first linear segment of the second spoke.

Additionally, the second linear segment 130 of the first spoke 120a is substantially parallel to the second linear segment 140 of the second spoke 120b. In an alternative direction, the second linear segment of the first spoke may extend from the upper ring at an angle different from that of the second linear segment of the second spoke. In another alternative embodiment, a second linear segment of at least one of the spokes forms a right angle with the upper ring.

Figure 3:
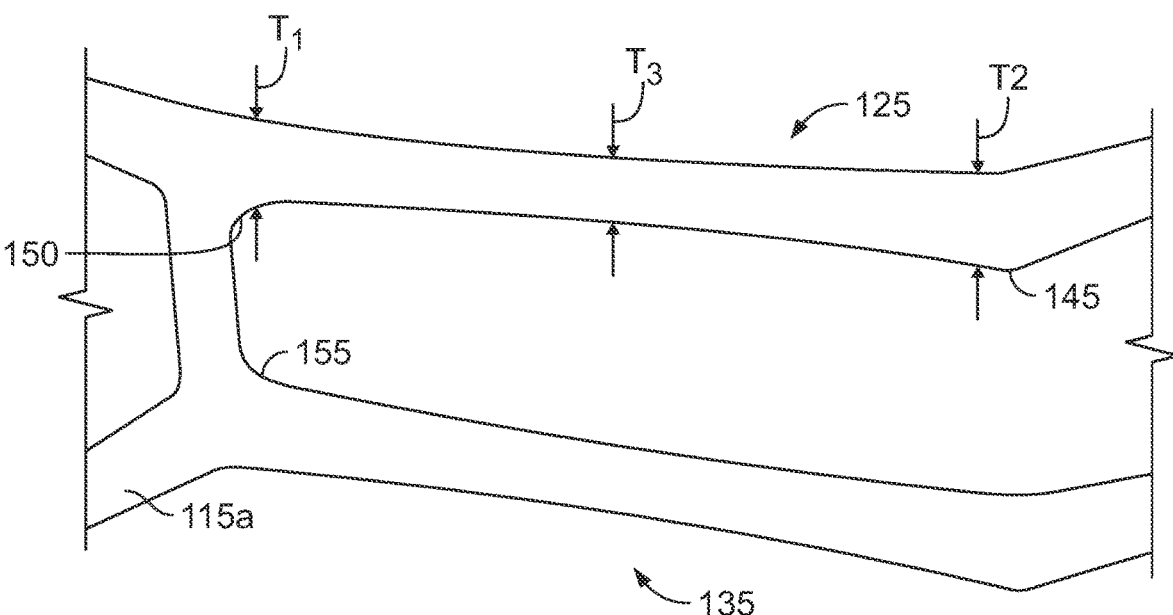
FIG. 3 is a partial front view of an enlarged portion of first linear segments of a pair of spokes in the hoop 100.

FIG. 3 illustrates a partial front view of an enlarged portion of the first linear segments 125, 135 of the pair of spokes 120a,b connected to the closed geometric shape 115a. As can be seen in this view, the first linear segment 125, 135 of each spoke 120a,b has a variable thickness. For example, the first linear segment 125 of the first spoke 120a has a first end with a first thickness $T_1$, a second end with a second thickness $T_2$, and a middle portion with a third thickness $T_3$. In the illustrated embodiment, the first thickness $T_1$ is approximately equal to the second thickness $T_2$, while the third thickness $T_3$ is less than the first thickness $T_1$ and less than the second thickness $T_2$.

In an alternative embodiment (not shown), the first thickness is greater than the second thickness, which is greater than the third thickness. In another alternative embodiment (not shown), the second thickness is greater than the first thickness, which is greater than the third thickness. In yet another alternative embodiment (not shown), the first thickness is approximately equal to the second thickness, while the third thickness is greater than both the first thickness and the second thickness. In still another embodiment (not shown), the first thickness is less than the second thickness, which is less than the third thickness. In yet another alternative embodiment (not shown), the second thickness is less than the first thickness, which is less than the third thickness.

Figure 4:
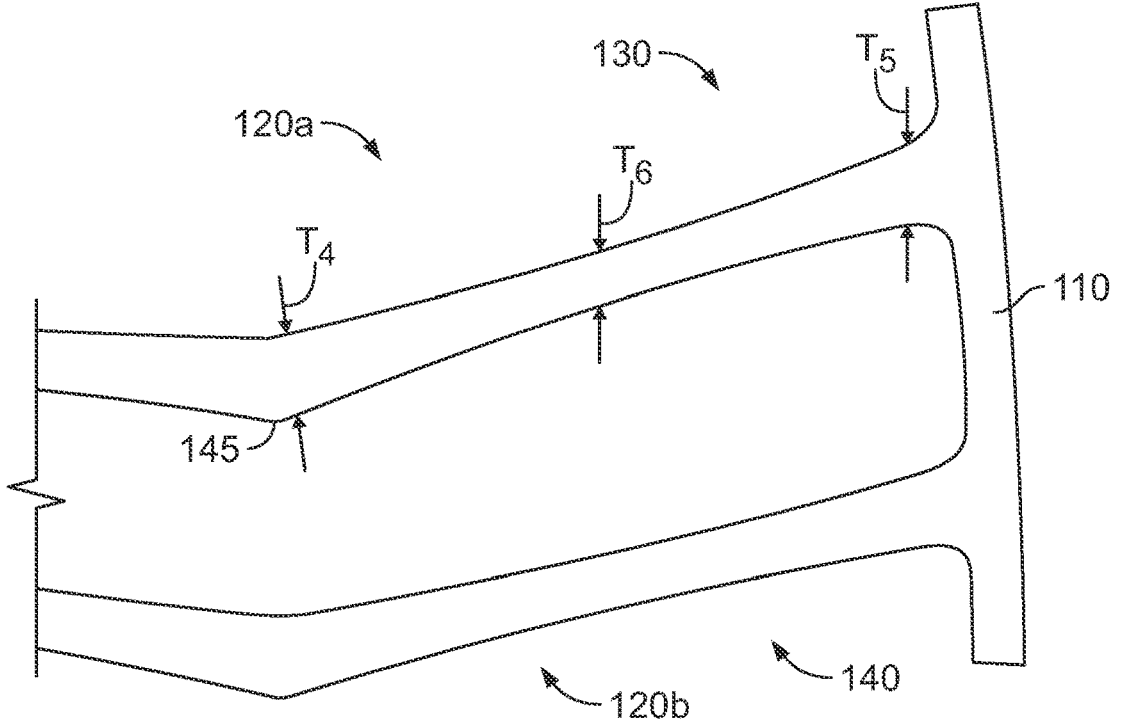
FIG. 4 is a partial front view of an enlarged portion of second linear segments of a pair of spokes in the hoop 100.
Figure 5:
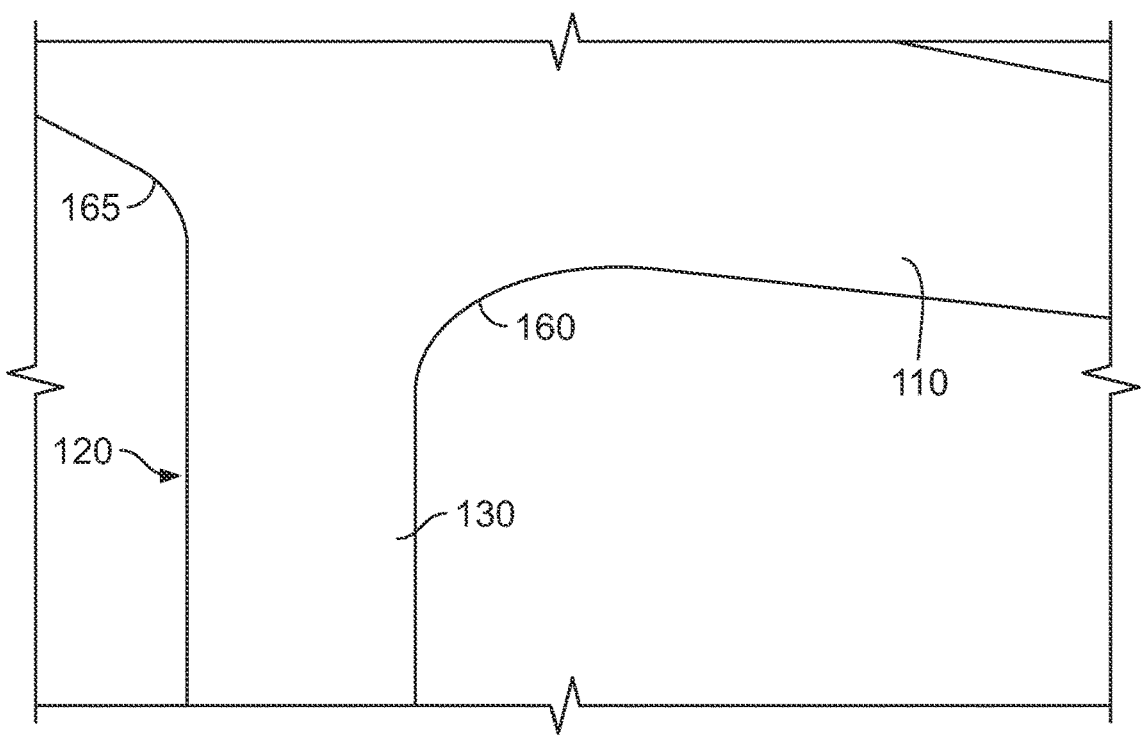
FIG. 5 is a partial front view of an enlarged portion of an interface between a second linear segment of a spoke and an upper ring of the hoop 100.
Figure 6:
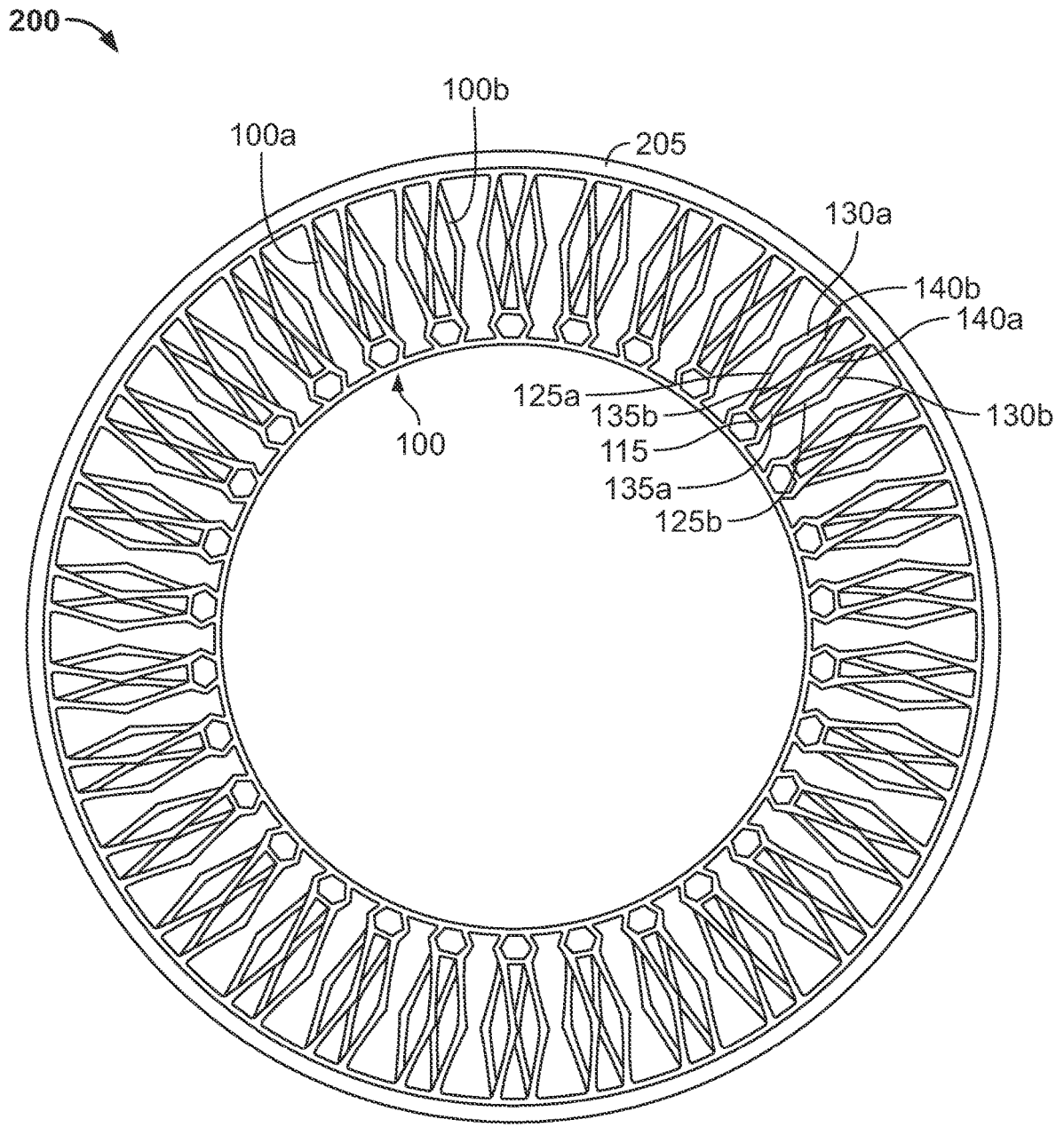
FIG. 6 is a front view of one embodiment of a plurality of hoops assembled to form a non-pneumatic tire.

FIG. 4 illustrates a partial front view of an enlarged portion of the second linear segments 130, 140 of the pair of spokes $120a,b$ connected to the upper ring $110$. As can be seen in this view, the second linear segment $130$, $140$ of each spoke $120a,b$ has a variable thickness. For example, the second linear segment $130$ of the first spoke $120a$ has a first end with a fourth thickness $T_4$, a second end with a fifth thickness $T_5$, and a middle portion with a sixth thickness $T_6$. In the illustrated embodiment, the fourth thickness $T_4$ is approximately equal to the fifth thickness $T_5$, while the sixth thickness $T_6$ is less than the fourth thickness $T_4$ and less than the fifth thickness $T_5$.

In an alternative embodiment (not shown), the fourth thickness is greater than the fifth thickness, which is greater than the sixth thickness. In another alternative embodiment (not shown), the fifth thickness is greater than the fourth thickness, which is greater than the sixth thickness. In yet another alternative embodiment (not shown), the fourth thickness is approximately equal to the fifth thickness, while the sixth thickness is greater than both the fourth thickness and the fifth thickness. In still another embodiment (not shown), the fourth thickness is less than the fifth thickness, which is less than the sixth thickness. In yet another alternative embodiment (not shown), the fifth thickness is less than the fourth thickness, which is less than the sixth thickness.

In the illustrated embodiment, the first, second, fourth, and fifth thicknesses $(T_1, T_2, T_4, T_5)$ are all approximately equal to each other. Likewise, the third thickness $T_3$ is approximately equal to the sixth thickness $T_6$. However, it should be understood that the relative thicknesses of these sections may vary. Varying the thickness of each spoke along its length in one of the manners described above may reduce or even minimize surface strain when the spoke deflects As can be seen in FIGS. 2-4, the first linear segment $125$, $135$ of each spoke $120a,b$ is joined by an elliptical transition $145$ to the respective second linear segment $130$, $140$. Using elliptical transitions, rather than circular fillets, may reduce or even minimize surface strain when the spoke deflects. However, for ease of manufacture, it may be desirable to employ different transitions. Thus, in an alternative embodiment, the first linear segment of each spoke is joined by a rounded (i.e., defined by the arc of a circle) or other curved transition to the respective second linear segment. A curved transition may be defined by multiple radii. In yet another alternative embodiment, the first linear segment and the second linear segment form a sharp angle. In still another alternative embodiment, one or more additional linear segments are disposed between the first and second linear segments.

Additionally, as best shown in FIG. 3, the first linear segment $125$, $135$ of each spoke $120a,b$ is joined by elliptical transitions $150$, $155$ to the closed geometric shape $115a$. In an alternative embodiment, the first linear segment of each spoke is joined by a rounded or other curved transition to the closed geometric shape. In yet another alternative embodiment, the first linear segment forms a sharp angle with the closed geometric shape.

FIG. $5$ illustrates a partial front view of an enlarged portion of an interface between a second linear segment $130$ of a spoke $120$ and the upper ring $110$ of the hoop $100$. In the illustrated embodiment, the second linear segment $130$ of each spoke $120$ is joined by a pair of elliptical transitions $160$, $165$ to the upper ring $110$. In an alternative embodiment, the second linear segment of each spoke is joined by a rounded or other curved transition to the upper ring. In yet another alternative embodiment, the second linear segment forms a sharp angle with the upper ring.

Because the second linear segment $130$ extends in a non-radial direction, it does not form a right angle with the upper ring $110$. Instead, the second linear segment forms an acute angle with the upper ring $110$ at a first elliptical transition $160$, and the second linear segment forms an obtuse angle with the upper ring $110$ at a second elliptical transition $165$. In an alternative embodiment, the second linear segment of each spoke is joined by rounded transitions to the upper ring. In yet another alternative embodiment, the second linear segment forms a sharp angle with the upper ring.

The angles and thicknesses of each linear segment may be selected to control the deflection of each spoke. Likewise, the shape of the joints or transitions between two linear segments, between a linear segment and an upper ring, or between a linear segment and a closed geometric shape may also be selected to control the deflection of each spoke. Such variables may be changed to control both the direction and the amplitude of the deflections and to reduce stress concentrations in the spokes, rings, and closed geometric shapes.

The hoop $100$ may be constructed of a polymeric material, such as natural or synthetic rubber, other elastomeric material. Alternatively, the hoop $100$ may be constructed of a harder polymeric material such as polyurethane, polyester, nylon and polyvinyl chloride (PVC). In all cases, the hoop $100$ may optionally include reinforcement layers, such as reinforcement cords or mesh, embedded in or disposed about certain components. The reinforcement may be formed by cords constructed of nylon, polyester, fiberglass, carbon fiber, aramid, glass, polyethylene (polyethylene terephthalate), steel, other metal, or other reinforcement materials. In another alternative embodiment, the hoop $100$ may be constructed of metal, such as steel, aluminum, or a metal alloy.

In one embodiment, a single hoop, such as the hoop $100$, may be used to form a non-pneumatic tire. In such an embodiment, a tread layer (not shown) may be disposed circumferentially about the hoop. The tread layer may be constructed of rubber or another elastomeric material. The tread layer may include a shear element, such as a shear band. A shear element may include one or more layers of substantially inelastic material. Such layers may be formed of a metal, such as steel. Such layers may be formed of a sheet of material or by cords of material. The shear element may optionally include a layer of extensible material, such as an elastomer. For example, the shear element may include a pair of inextensible layers separated by a layer of extensible material.

The tread layer may also include a plurality of tread elements, such as grooves, ribs, blocks, lugs, sipes, and other known tread elements. In an alternative embodiment (not shown), a separate tread layer may be omitted. In such an instance, tread elements may be formed directly on the upper ring of the hoop.

Alternatively, a plurality of hoops may be assembled to form a non-pneumatic tire. For example, FIG. $6$ illustrates a front view of one embodiment of a plurality of hoops $100$ assembled to form a non-pneumatic tire $200$ having a tread $205$. In this embodiment, each of the hoops $100$ is substantially the same as the hoop $100$ shown in FIGS. 1-5 and discussed above. Like numbers are used for like components. It should be understood, however, that any of the alternative embodiments of hoops discussed above may likewise be applied to a multiple-hoop embodiment. Additionally, in an alternative embodiment, hoops with different features may be employed in a multiple-hoop tire.

In the illustrated embodiment, the plurality of hoops 100 of the non-pneumatic tire 200 includes a first hoop 100*a*, a second hoop 100*b*, and a series of additional hoops. Each hoop 100 has opposing faces lying in opposing planes substantially perpendicular to a rotational axis of the non-pneumatic tire 200. In one embodiment, each hoop 100 is 1 inch (2.54 cm) wide and the non-pneumatic tire 200 includes 12 hoops and is thus 12 inches (30.48 cm) wide. In alternative embodiments, each hoop may have a width of 0.5 to 6 inches (1.27 to 15.24 cm) and the non-pneumatic tire may be formed of 1 to 120 hoops, such that the non-pneumatic tire has a width of 5 to 12 inches (12.7 to 30.48 cm).

In the illustrated embodiment, the hoops 100 are arranged such that the opening of each of the plurality of closed geometric shapes 115 of the first hoop 100*a* is aligned with an opening of a corresponding one of the plurality of closed geometric shapes 115 of the second hoop 100*b* and subsequent hoops. The first hoop 100*a* is arranged in a first orientation and the second hoop is arranged in an opposite orientation, and the subsequent hoops are arranged in alternating orientations.

Thus, the first linear segment 125*a* of a first spoke connected to the first closed geometric shape 115 on the first hoop 100*a* extends in a different direction from the first linear segment 125*b* of a first spoke connected to the first closed geometric shape 115 on the second hoop 100*b*. Similarly, the second linear segment 130*a* of the first spoke extending from the first closed geometric shape 115 on the first hoop 100*a* extends in a different direction from the second linear segment 130*b* of the first spoke extending from the first closed geometric shape 115 on the second hoop 100*b*.

Here, the first and second hoops 100*a,b* are dimensioned such that the first linear segment 125*a* of the first spoke extending from the first closed geometric shape 115 on the first hoop 100*a* is substantially parallel to the second linear segment 130*b* of the first spoke extending from the first closed geometric shape 115 on the second hoop 100*b*. Additionally, the second linear segment 130*a* of the first spoke extending from the first closed geometric shape 115 on the first hoop 100*a* is substantially parallel to the first linear segment 125*b* of the first spoke connected to the first closed geometric shape 115 on the second hoop 100*b*.

Likewise, the first linear segment 135*a* of the second spoke extending from the first closed geometric shape 115 on the first hoop 100*a* is substantially parallel to the second linear segment 140*b* of the second spoke extending from the first closed geometric shape 115 on the second hoop 100*b*. Additionally, the second linear segment 140*a* of the second spoke extending from the first closed geometric shape 115 on the first hoop 100*a* is substantially parallel to the first linear segment 135*b* of the second spoke connected to the first closed geometric shape 115 on the second hoop 100*b*. In alternative embodiments, however, segments of different spokes are not parallel to each other.

In one embodiment, adjacent hoops in a tire are axially spaced apart from each other. In an alternative embodiment, adjacent hoops contact each other. In all embodiments, however, the hoops 100 are assembled such that adjacent hoops are not directly adhered to each other or otherwise directly affixed to each other. In this way, the deflection of a given spoke is not constrained by the spokes or webbing of an adjacent hoop.

Figure 7:
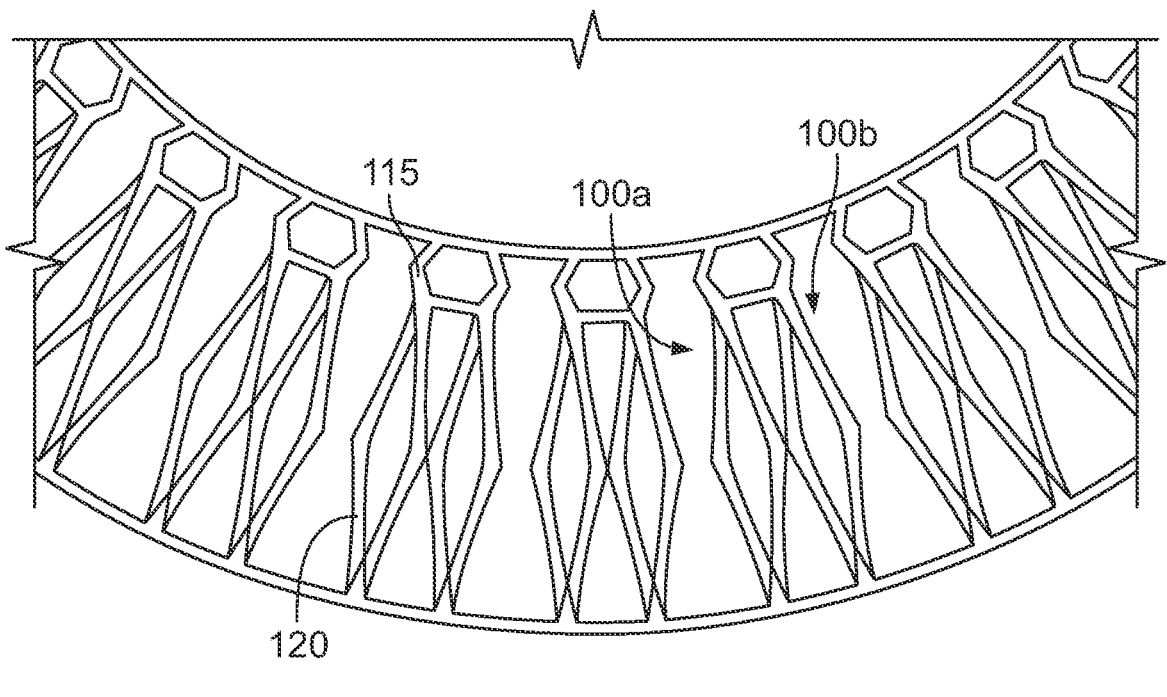
FIG. 7 is a partial front view of one embodiment of a partially assembled non-pneumatic tire having a first hoop and a second hoop.
Figure 8:
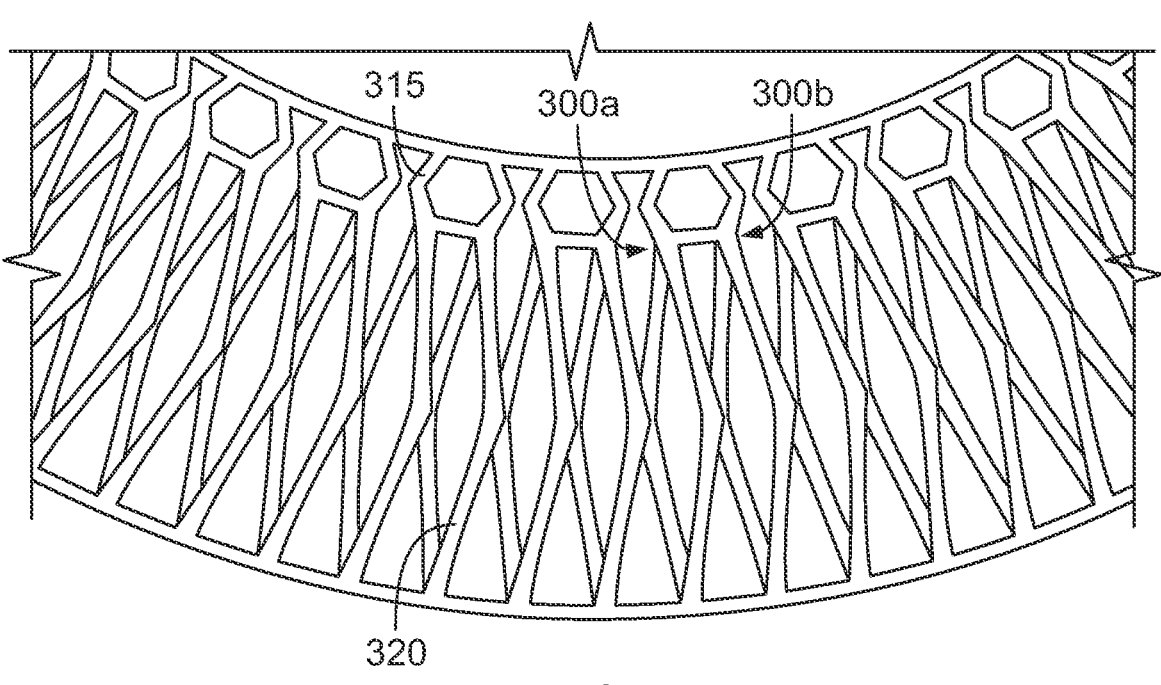
FIG. 8 is a partial front view of an alternative embodiment of a partially assembled non-pneumatic tire having a first hoop and a second hoop.

The stiffness of the hoops may be tuned by varying the number of pitches around the circumference of the hoop. For example, the hoop 100 shown in FIG. 1 has 30 pitches. That is, the hoop 100 includes 30 closed geometric shapes 115 and 30 associated pairs of spokes 120 (for a total of 60 spokes 120). This 30-pitch arrangement is also shown in FIG. 7, which illustrates a partial front view of one embodiment of a partially assembled non-pneumatic tire having a first hoop 100*a* and a second hoop 100*b*. By contrast, FIG. 8 illustrates a partial front view of an alternative embodiment of a partially assembled non-pneumatic tire having a first hoop 300*a* and a second hoop 300*b*. In this embodiment, each hoop 300*a,b* has 45 pitches. That is, each hoop 300*a,b* includes 45 closed geometric shapes 315 and 45 associated pairs of spokes 320 (for a total of 90 spokes 320). The pitches in the hoops 300*a,b* are spaced relatively closer together compared to the pitches in the hoops 100*a,b*. Thus, the hoops 300*a,b* are stiffer than the hoops 100*a,b*, when the hoops are made of similar materials and are similarly dimensioned.

To make one of the non-pneumatic tires described above, a manufacturer provides a first hoop having a first face and a second face. The first hoop includes a first lower ring extending laterally from the first face to the second face and a first upper ring extending laterally from the first face to the second face. The first upper ring is substantially coaxial with the first lower ring. The first hoop further includes a first plurality of closed geometric shapes connected to the first lower ring and extending laterally from the first face to the second face, and a first plurality of spokes extending from the first plurality of closed geometric shapes to the first upper ring. Each of the plurality of spokes includes a first linear segment connected to one of the first plurality of closed geometric shapes and extending in a first direction and a second linear segment connected to the upper ring and extending in a second direction different from the first direction.

The manufacturer also provides a second hoop having a first face and a second face. The second hoop includes a second lower ring extending laterally from the first face to the second face, and a second upper ring extending laterally from the first face to the second face. The second upper ring is substantially coaxial with the second lower ring. The second hoop further includes a second plurality of closed geometric shapes connected to the second lower ring and extending laterally from the first face to the second face, and a second plurality of spokes extending from the second plurality of closed geometric shapes to the second upper ring, the second plurality of spokes having substantially the same geometry as the first plurality of spokes.

The manufacturer then aligns the first face of the first hoop with the first face of the second hoop such that the first plurality of spokes extend in a direction opposite to the second plurality of spokes. The aligning of the first face of the first hoop with the first face of the second hoop may include placing the first hoop adjacent to the second hoop without adhering the first plurality of spokes to the second plurality of spokes. The first hoop may contact the second hoop, or it may be axially spaced from the second hoop.

In some embodiments, the manufacturer may also provide a third hoop having a first face and a second face. The third hoop includes a third lower ring extending laterally from the first face to the second face, and a third upper ring extending laterally from the first face to the second face, the third upper ring being substantially coaxial with the third lower ring. The third hoop further includes a third plurality of closed geometric shapes connected to the third lower ring and extending laterally from the first face to the second face, and a third plurality of spokes extending from the third plurality of closed geometric shapes to the third upper ring. The third plurality of spokes may have substantially the same geometry as the first plurality of spokes. The manufacturer then aligns the second face of the third hoop with the second face of the second hoop such that the third plurality of spokes extend in a direction opposite to the second plurality of spokes. The manufacturer may repeat this process until a desired number of hoops have been assembled.

In one embodiment, the manufacturer also wraps a tread circumferentially about the first upper ring and the second upper ring. In an alternative embodiment, the manufacturer may form tread elements in the upper rings of the assembled hoops.

Figures 9, 10:
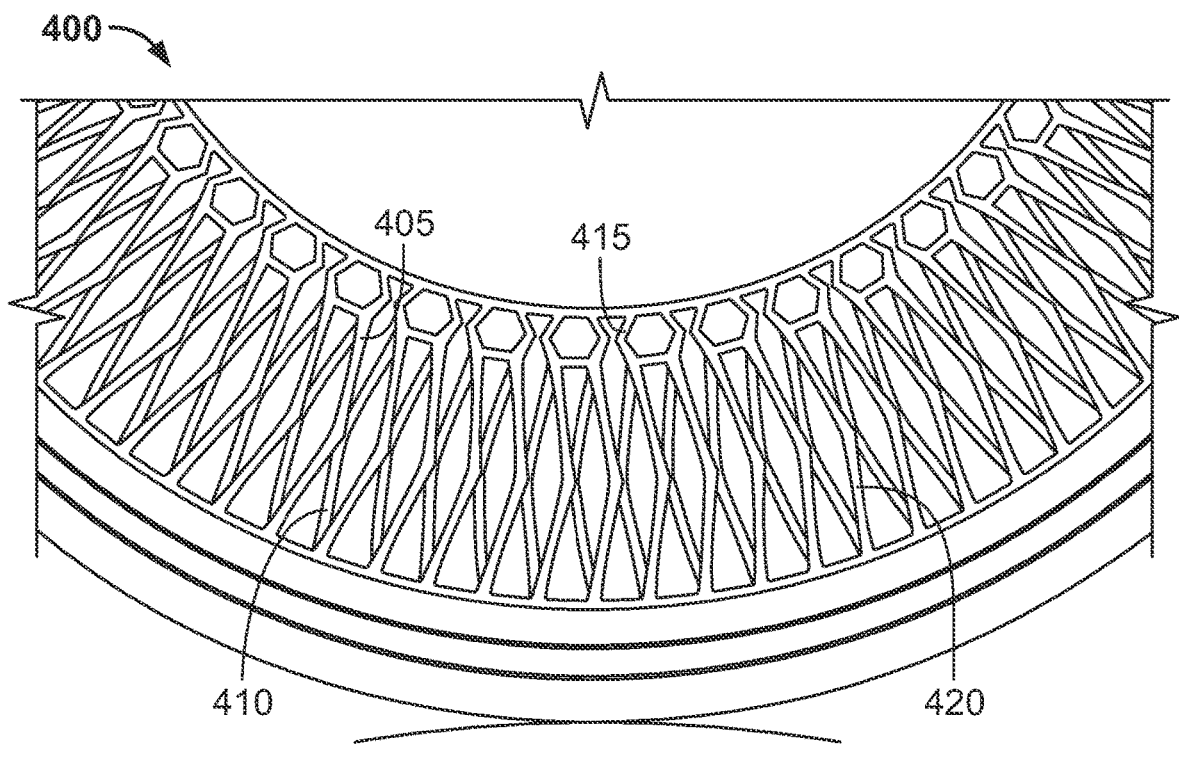
FIG. 9 is a partial front view of a simplified embodiment of a non-pneumatic tire 400 having a first hoop and a second hoop in an unloaded state.
FIG. 10 is a partial front view of the non-pneumatic tire 400 in a loaded state.

The spokes of the assembled tire may be designed to deflect by a desired amount in a desired direction under a given load. One example of the deflection of spokes in a non-pneumatic tire is shown in FIGS. 9 and 10. FIG. 9 illustrates a partial front view of a simplified embodiment of a non-pneumatic tire 400 having a first hoop 405 and a second hoop 410 in an unloaded state. The first hoop 405 and the second hoop 410 each include a plurality of closed geometric shapes 415 and a plurality of spokes 420, similar to the closed geometric shapes and spokes described above in other embodiments.

FIG. 10 illustrates a partial front view of the non-pneumatic tire 400 in a loaded state. When the non-pneumatic tire 400 is placed under a load above a pre-determined threshold, the spokes 420 below the axis of rotation deflect accordingly. The spokes feature a directional geometry so that they are predisposed to buckle in a specific direction when the spokes deflect to avoid colliding with neighboring spokes. In the illustrated embodiment, the spokes 420 in the first hoop 405 deflect in a first direction and the spokes 420 in the second hoop 410 deflect in a second direction different from the first direction.

In one embodiment, the non-pneumatic tire may be designed to carry a load of 5000 lbf or more, while maximizing fatigue resistance. In other words, the designer of the non-pneumatic tire may select the angles and thicknesses of each linear segment to control the deflection of each spoke under such a load. Likewise, the designer of the non-pneumatic tire may select the shape of the joints or transitions between two linear segments, between a linear segment and an upper ring, or between a linear segment and a closed geometric shape to control the deflection of each spoke under such a load.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative apparatus and method, and illustrative examples shown and described. Accordingly, departures may be made from such details without departing from the spirit or scope of the applicant's general inventive concept.

What is claimed is:

1. A non-pneumatic tire comprising:
   a plurality of hoops including at least a first hoop and a second hoop, each of the plurality of hoops having opposing faces lying in opposing planes perpendicular to a rotational axis of the non-pneumatic tire, wherein each of the plurality of hoops includes:
   a lower ring having a first diameter;
   an upper ring having a second diameter greater than the first diameter, the upper ring being coaxial with the lower ring;
   a support structure extending between the lower ring and the upper ring, wherein the support structure includes:
   a plurality of closed geometric shapes connected to the lower ring, and
   a plurality of spokes extending from each closed geometric shape to the upper ring, each of the plurality of spokes including a first linear segment connected to one of the plurality of closed geometric shapes and extending in a first direction and a second linear segment connected to the upper ring and extending in a second direction different from the first direction,
   wherein the plurality of spokes extending from each closed geometric shape includes a first spoke and a second spoke, and
   wherein the first linear segment of the first spoke is parallel to the first linear segment of the second spoke.

2. The non-pneumatic tire of claim 1, wherein each of the plurality of closed geometric shapes defines an opening that is visible from a first side of the non-pneumatic tire.

3. The non-pneumatic tire of claim 2, wherein each opening of the plurality of closed geometric shapes of the first hoop is aligned with a corresponding opening of the plurality of closed geometric shapes of the second hoop.

4. The non-pneumatic tire of claim 1, wherein the second linear segment of the first spoke is substantially parallel to the second linear segment of the second spoke.

5. The non-pneumatic tire of claim 1, wherein a first closed geometric shape on the first hoop is aligned with a first closed geometric shape on the second hoop, wherein the first linear segment of the first spoke connected to the first closed geometric shape on the first hoop extends in a different direction from a first linear segment of a first spoke connected to the first closed geometric shape on the second hoop, and wherein the second linear segment of the first spoke extending from the first closed geometric shape on the first hoop extends in a different direction from a second linear segment of the first spoke extending from the first closed geometric shape on the second hoop.

6. The non-pneumatic tire of claim 1, wherein the plurality of spokes of the first hoop are configured to deflect in a first deflection direction when a load is applied to the non-pneumatic tire.

7. The non-pneumatic tire of claim 6, wherein the plurality of spokes of the second hoop are configured to deflect in a second deflection direction opposite to the first deflection direction when a load is applied to the non-pneumatic tire.

8. The non-pneumatic tire of claim 1, wherein the first linear segment of each spoke is joined by an elliptical transition to the second linear segment.

9. A method of making a non-pneumatic tire, the method comprising:

providing a first hoop having a first face and a second face, the first hoop including:

a first lower ring extending laterally from the first face to the second face;

a first upper ring extending laterally from the first face to the second face, the first upper ring being coaxial with the first lower ring;

a first plurality of closed geometric shapes connected to the first lower ring and extending laterally from the first face to the second face, and a first plurality of spokes extending from the first plurality of closed geometric shapes to the first upper ring, each of the first plurality of spokes including a first linear segment connected to one of the first plurality of closed geometric shapes and extending in a first direction and a second linear segment connected to the upper ring and extending in a second direction different from the first direction, wherein the plurality of spokes extending from each closed geometric shape includes a first spoke and a second spoke, and wherein the first linear segment of the first spoke is parallel to the first linear segment of the second spoke;

providing a second hoop having a first face and a second face, the second hoop including:

a second lower ring extending laterally from the first face to the second face;

a second upper ring extending laterally from the first face to the second face, the second upper ring being coaxial with the second lower ring;

a second plurality of closed geometric shapes connected to the second lower ring and extending laterally from the first face to the second face, and a second plurality of spokes extending from the second plurality of closed geometric shapes to the second upper ring, the second plurality of spokes having the same geometry as the first plurality of spokes; and aligning the first face of the first hoop with the first face of the second hoop such that the first plurality of spokes extend in a direction opposite to the second plurality of spokes.

10. The method of claim 9, further comprising wrapping a tread circumferentially about the first upper ring and the second upper ring.

11. The method of claim 9, wherein the aligning of the first face of the first hoop with the first face of the second hoop includes placing the first hoop adjacent to the second hoop without adhering the first plurality of spokes to the second plurality of spokes.

12. The method of claim 9, further comprising applying an elliptical transition between the first linear segment and the second linear segment of each spoke.

13. The method of claim 9, further comprising:

providing a third hoop having a first face and a second face, the third hoop including:

a third lower ring extending laterally from the first face to the second face;

a third upper ring extending laterally from the first face to the second face, the third upper ring being coaxial with the third lower ring;

a third plurality of closed geometric shapes connected to the third lower ring and extending laterally from the first face to the second face, and a third plurality of spokes extending from the third plurality of closed geometric shapes to the third upper ring, the third plurality of spokes having the same geometry as the first plurality of spokes; and aligning the second face of the third hoop with the second face of the second hoop such that the third plurality of spokes extend in a direction opposite to the second plurality of spokes.

14. The method of claim 9, wherein each of the first plurality of closed geometric shapes has a hexagonal shape and wherein each of the second plurality of closed geometric shapes has a hexagonal shape.

15. A non-pneumatic tire comprising:

a lower ring having a first diameter;

an upper ring having a second diameter greater than the first diameter;

a plurality of closed geometric shapes connected to the lower ring; and a plurality of spokes extending from each closed geometric shape to the upper ring, each of the plurality of spokes including a first linear segment connected to one of the plurality of closed geometric shapes and extending in a first direction and a second linear segment connected to the upper ring and extending in a second direction different from the first direction, wherein the plurality of spokes extending from each closed geometric shape includes a first spoke and a second spoke, and wherein the first linear segment of the first spoke is parallel to the first linear segment of the second spoke.

16. The non-pneumatic tire of claim 15, wherein the first linear segment of each spoke has a variable thickness, such that the first linear segment includes a first end having a first thickness, a second end having a second thickness, and a middle portion having a third thickness that is less than the first thickness and less than the second thickness.

17. The non-pneumatic tire of claim 16, wherein the second linear segment of each spoke has a variable thickness, such that the second linear segment includes a first end having a fourth thickness, a second end having a fifth thickness, and a middle portion having a sixth thickness that is less than the fourth thickness and less than the fifth thickness.

18. The non-pneumatic tire of claim 17, wherein the fourth thickness is the same as the second thickness.

19. The non-pneumatic tire of claim 15, wherein the second linear segment of each spoke forms an acute angle with the upper ring.

* * * * *